US012567636B2

(12) United States Patent
An et al.

(10) Patent No.: US 12,567,636 B2
(45) Date of Patent: Mar. 3, 2026

(54) BATTERY PACK HAVING HANDLE

(71) Applicant: LG Energy Solution, Ltd., Seoul (KR)

(72) Inventors: Ji-Myong An, Daejeon (KR);
Young-Kyu Lee, Daejeon (KR)

(73) Assignee: LG ENERGY SOLUTION, LTD.,
Seoul (KR)

( * ) Notice: Subject to any disclaimer, the term of this
patent is extended or adjusted under 35
U.S.C. 154(b) by 579 days.

(21) Appl. No.: 17/762,201

(22) PCT Filed: Sep. 11, 2020

(86) PCT No.: PCT/KR2020/012346
§ 371 (c)(1),
(2) Date: Mar. 21, 2022

(87) PCT Pub. No.: WO2021/071114
PCT Pub. Date: Apr. 15, 2021

(65) Prior Publication Data
US 2022/0376342 A1 Nov. 24, 2022

(30) Foreign Application Priority Data
Oct. 8, 2019 (KR) ........................ 10-2019-0124815

(51) Int. Cl.
*H01M 50/256* (2021.01)
*H01M 50/213* (2021.01)

(52) U.S. Cl.
CPC ....... *H01M 50/256* (2021.01); *H01M 50/213*
(2021.01); *H01M 2220/20* (2013.01)

(58) Field of Classification Search
CPC ............. H01M 50/256; H01M 50/213; H01M
2220/20
(Continued)

(56) References Cited

U.S. PATENT DOCUMENTS 4,013,819 A * 3/1977 Grabb ................. H01M 50/256
429/187
5,111,952 A 5/1992 Stocchiero
(Continued)

FOREIGN PATENT DOCUMENTS

CA 2175291 A1 1/1997
CN 2613058 Y 4/2004
(Continued)

OTHER PUBLICATIONS

CN-207417059-U English Translation (Year: 2018).*
(Continued)

*Primary Examiner* — Nicholas A Smith
*Assistant Examiner* — Kevin Nguyen
(74) *Attorney, Agent, or Firm* — Morgan, Lewis &
Bockius LLP

(57) ABSTRACT

A battery pack including a battery module having a plurality
of secondary batteries; and a pack housing including an
outer wall to form an inner space for accommodating the
battery module, a handle having a handle bar to elongate in
one direction and a strap in the form of a bendable strap to
respectively extend from both ends of the handle bar, and an
accommodation portion such that the handle bar is loaded
therein, wherein the strap is embedded in the accommoda-
tion portion in a state of being bent at least once when the
handle bar is loaded in the accommodation portion, and
wherein a center portion between extensions of the strap
respectively extending from both ends of the handle bar is
caught in the accommodation portion when the handle bar is
drawn out.

9 Claims, 7 Drawing Sheets

(58) Field of Classification Search

USPC ........................................................ 429/99

See application file for complete search history.

(56) References Cited

U.S. PATENT DOCUMENTS

| | | | |
|---|---|---|---|
| 6,564,893 B2 | 5/2003 | Lipman | |
| 2001/0053478 A1 | 12/2001 | Kump et al. | |
| 2008/0199771 A1 | 8/2008 | Chiu | |
| 2013/0029199 A1* | 1/2013 | Andersen | B60L 50/66 |
| | | | 429/96 |
| 2017/0229687 A1 | 8/2017 | Elison | |
| 2018/0047953 A1 | 2/2018 | Elison et al. | |
| 2020/0046100 A1* | 2/2020 | Tayne | A45C 13/26 |

FOREIGN PATENT DOCUMENTS

| | | | | |
|---|---|---|---|---|
| CN | 106159131 A | 11/2016 | | |
| CN | 205921043 U | 2/2017 | | |
| CN | 206006277 U | 3/2017 | | |
| CN | 207417059 U | 5/2018 | | |
| CN | 208336290 U | 1/2019 | | |
| CN | 208722949 U | 4/2019 | | |
| CN | 208939044 U | 6/2019 | | |
| GB | 869329 A | 5/1961 | | |
| GB | 2502916 A | * 12/2013 | ............ | A45C 13/28 |
| JP | 46-33784 Y | 11/1971 | | |
| JP | 62-8705 A | 1/1987 | | |
| JP | 4-101363 U | 9/1992 | | |
| JP | H08-038651 A | 2/1996 | | |
| JP | H09-98824 A | 4/1997 | | |
| JP | 2015-220202 A | 12/2015 | | |
| KR | 20-0411406 Y1 | 3/2006 | | |
| KR | 20-0432713 Y1 | 12/2006 | | |
| KR | 10-2014-0099984 A | 8/2014 | | |
| KR | 10-2017-0129365 A | 11/2017 | | |

OTHER PUBLICATIONS

English Translation of CN106159131A (Year: 2025).*

First Office Action issued in corresponding Japanese Patent Application No. 2021-573228 dated Jan. 10, 2023.

Extended European Search Report issued in corresponding European Patent Application No. 20875549.6 dated Jul. 15, 2022.

Office Action issued in corresponding Chinese Patent Application No. 202080049175.5 dated Sep. 29, 2023. Note: CN2613058Y and CN106159131A cited therein are already of record.

International Search Report and Written Opinion (with partial English translation) issued in corresponding International Patent Application No. PCT/KR2020/012346 dated Dec. 18, 2020.

Japanese Office Action issued in corresponding JP Application No. 2021-573228, dated Jul. 18, 2023. Note: CN 106159131 A, JP 4-101363 U, JP 46-33784 Y and JP 62-8705 A cited therein are already of record.

Office Action issued in corresponding Chinese Patent Application No. 202080049175.5, dated Jul. 13, 2024. Note: CN2613058Y and CN207417059U cited therein are already of record.

\* cited by examiner

BATTERY PACK HAVING HANDLE

TECHNICAL FIELD

The present disclosure relates to a battery pack including a handle, and more particularly, to a battery pack that is convenient in use and has improved energy density.

The present application claims priority to Korean Patent Application No. 10-2019-0124815 filed on Oct. 8, 2019 in the Republic of Korea, the disclosures of which are incorporated herein by reference.

BACKGROUND ART

Currently commercialized secondary batteries include nickel cadmium batteries, nickel hydride batteries, nickel zinc batteries, and lithium secondary batteries. Among them, the lithium secondary battery is in the spotlight since it has advantages such as free charging and discharging due to little memory effect compared to nickel-based secondary batteries, a very low self-discharge rate and a high energy density.

The lithium secondary battery mainly uses lithium-based oxide and carbon material as a positive electrode active material and a negative electrode active material, respectively. The lithium secondary battery includes an electrode assembly in which a positive electrode plate and a negative electrode plate respectively coated with a positive electrode active material and a negative electrode active material are disposed with a separator being interposed therebetween, and a cylindrical battery can that seals the electrode assembly together with an electrolyte.

In recent years, secondary batteries are widely used not only in small devices such as portable electronic devices, but also in medium and large devices such as vehicles and power storage devices. When used in such a medium or large device, a large number of secondary batteries are electrically connected to increase capacity and output.

Meanwhile, as the need for a large-capacity structure increases along with use as an energy storage source in recent years, the demand for a battery pack including a number of secondary batteries electrically connected in series and/or in parallel, a module case containing the secondary batteries therein and battery management system (BMS) is increasing.

Also, the battery pack generally further includes an external housing having a metal material or reinforced plastic to protect or store a plurality of secondary batteries from external shocks, separate from the module case.

In addition, in some cases, a handle is provided to the external housing so that a user may move while picking up the battery pack.

However, in the conventional art, the handle provided to the exterior of the external housing is shaped to protrude outward. Thus, when the battery pack is accommodated, the handle may limit the accommodation space for the battery pack, and the handle is highly likely to interfere or collide with an external object, which may damage the handle.

Moreover, the conventional handle generally uses a hook structure made of metal or the like at a connection portion between the handle and the pack housing in order to simply restrain an end of the handle not to move more than a predetermined distance. However, when the user moves while picking up a heavy battery pack, the force caused by the weight of the battery pack is concentrated on the hook structure, so the coupling structure between the handle and the pack housing is easily destroyed. Accordingly, the durability of the battery pack is greatly deteriorated.

DISCLOSURE

Technical Problem

The present disclosure is designed to solve the problems of the related art, and therefore the present disclosure is directed to providing a battery pack that is convenient in use and has improved durability.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:

a battery module having a plurality of secondary batteries; and a pack housing including an outer wall configured to form an inner space for accommodating the battery module, a handle having a handle bar configured to elongate in one direction and a strap configured in the form of a bendable strap to respectively extend from both ends of the handle bar, and an accommodation portion configured so that the handle bar is loaded therein, the accommodation portion being configured such that the strap is embedded therein in a state of being bent at least once when the handle bar is loaded therein, the accommodation portion being configured such that a center portion between extensions of the strap respectively extending from both ends of the handle bar is caught therein when the handle bar is drawn out.

Also, the accommodation portion may include:

a stopper configured to block the center portion between the extensions of the strap respectively extending from both ends of the handle bar not to move upward; and an accommodation space in which the strap is embedded in a state of being bent at least once.

Moreover, the handle bar may be configured to be loaded on the stopper, a receiving space containing a first magnetic body may be provided to a lower portion of the stopper, and the handle bar may include a second magnetic body configured to apply an attractive force to the first magnetic body by a magnetic force.

In addition, the strap may have a loop form connected integrally, and a part of the strap may be positioned inside the handle bar.

Further, the strap may include:

a first extension configured to extend from one longitudinal end of the handle bar; and a second extension configured to extend from the other longitudinal end of the handle bar and having an end coupled to an end of the first extension to overlap with the end.

Also, the accommodation portion may have a slit in which the portions of the first extension and the second extension coupled to each other to overlap is inserted and fixed.

Moreover, the handle may further include:

an auxiliary support hinged to the handle bar such that the other end thereof is moved away from the handle bar by pivotal movement based on the hinged portion when the handle bar is drawn out of the accommodation portion by a user, and the other end of the auxiliary support moved by pivotal movement based on the hinged portion is supported on the stopper.

In addition, the stopper may include a holding protrusion shaped corresponding to the other end of the auxiliary support and protruding upward to restrain the pivotal movement of the other end of the auxiliary support based on the hinged portion.

Also, the accommodation portion may include:

an elastic member configured to elastically press a part of the strap upward or downward.

Further, when the handle is drawn out of the accommodation portion, the elastic member may be contracted by a predetermined distance to block the center portion between the extensions of the strap respectively extending from both ends of the handle bar not to move.

Moreover, in another aspect of the present disclosure, there is also provided an electronic device, comprising at least one battery pack.

Also, in another aspect of the present disclosure, there is also provided a vehicle, comprising at least one battery pack.

Advantageous Effects

According to an embodiment of the present disclosure, since the pack housing is configured such that the handle bar is loaded therein and includes the accommodation portion configured such that the strap is embedded therein to be bent at least once when the handle bar is loaded, the strap of the handle accommodated in the pack housing may be accommodated in a bent shape, thereby minimizing the volume occupied by the strap, compared to the conventional case where a connection portion (a leg portion) of the handle is made of hard material. Accordingly, the battery pack of the same size may have a greater inner space, thereby effectively increasing the energy density of the battery pack.

Also, according to an embodiment of the present disclosure, since the accommodation portion includes the stopper that blocks the center portion between the extensions of the strap respectively extending from both ends of the handle bar not to move upward, compared with the conventional handle (not shown), when the handle bar is drawn out, the accommodation portion may effectively restrain the handle bar by the stopper not to move upward. At this time, since the bendable strap may maximize the area in close contact with the stopper, it is possible to effectively prevent the internal structure of the pack housing from being damaged or broken during the use of the handle.

In addition, according to an embodiment of the present disclosure, since the receiving space including the first magnetic body therein is provided below the stopper and the handle bar includes the second magnetic body configured to apply an attractive force to the first magnetic body by a magnetic force, the handle bar may be easily mounted in the accommodation portion. That is, the handle bar may be automatically fixed in position in the accommodation portion by means of the magnetic force of the first magnetic body and the second magnetic body. Accordingly, the convenience of use of the battery pack of the present disclosure may be greatly improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 6 is a partial perspective view schematically showing that the handle of a battery pack according to another embodiment of the present disclosure is drawn out.

FIG. 9 is a partial perspective view schematically showing some components of a battery pack according to still another embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
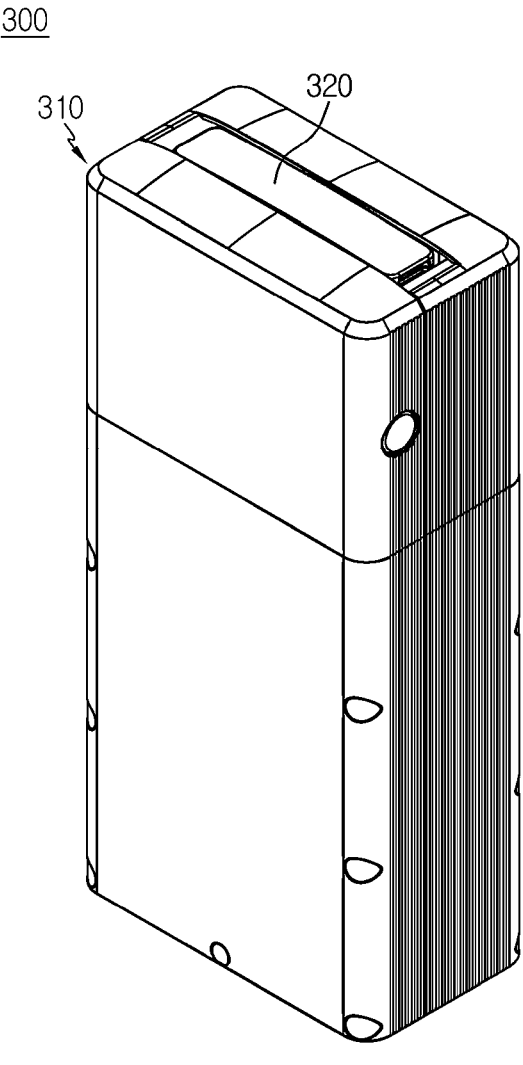
FIG. 1 is a perspective view schematically showing a battery pack according to an embodiment of the present disclosure.

FIG. 1 is a perspective view schematically showing a battery pack according to an embodiment of the present disclosure. Also, FIG. 2 is an exploded perspective view schematically showing some components of the battery pack according to an embodiment of the present disclosure.

Figure 2:
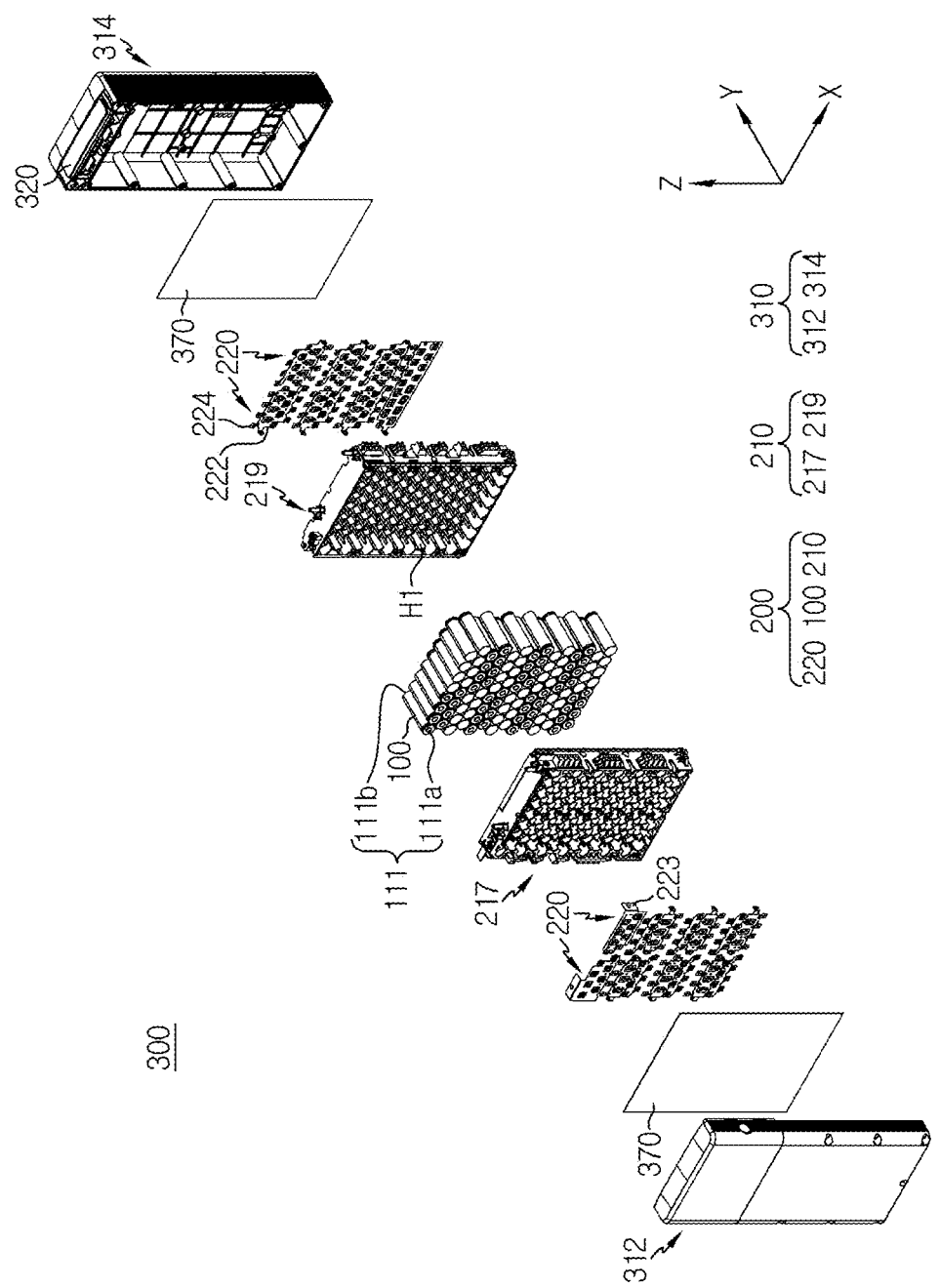
FIG. 2 is an exploded perspective view schematically showing some components of the battery pack according to an embodiment of the present disclosure.

Referring to FIGS. 1 and 2, a battery pack 300 of the present disclosure includes a battery module 200 and a pack housing 310.

The battery module 200 may include a plurality of secondary batteries 100, a module case 210, and a bus bar 220.

Here, the plurality of secondary batteries 100 may be can-type secondary batteries 100. Here, the secondary battery 100 may include an electrode assembly (not shown) therein.

The electrode assembly may have a structure in which a positive electrode plate and a negative electrode plate are wound with a separator being interposed therebetween. Also, a positive electrode tab may be attached to the positive electrode plate to be connected to a cap assembly, and a negative electrode tab may be attached to the negative electrode plate to be connected to a bottom of a battery can.

The battery can may have an empty space formed therein to accommodate the electrode assembly. In particular, the battery can may be configured in a cylindrical or rectangular shape, with an open top. In addition, the battery can may be made of a metal material such as steel or aluminum to secure rigidity. Also, the negative electrode tab may be attached to the bottom of that the battery can so that not only the bottom of the battery can but also the entire battery can functions as a negative electrode terminal.

The configuration of the secondary battery 100 is widely known to those skilled in the art at the time of filing this application, and thus will not be described in detail in this specification. In addition, although an example of the secondary battery 100 is shown in FIG. 2, the battery module 200 according to the present disclosure is not limited to a configuration of a secondary battery 100 of a specific type. That is, various secondary batteries 100 known at the time of filing this application may be employed in the battery module 200 according to the present disclosure.

Moreover, the secondary battery 100 of FIG. 2 is depicted as a cylindrical secondary battery 100, but a rectangular secondary battery may also be applied to the battery module 200 according to the present disclosure.

Referring to FIG. 2 again, the plurality of secondary batteries 100 may be arranged in a left and right direction (an X-axis direction) and an upper and lower direction (a Z-axis direction). For example, as shown in FIG. 2, the plurality of secondary batteries 100 may be arranged in an upper and lower direction and a left and right direction. Moreover, the plurality of secondary batteries 100 may be arranged such that portions formed in a tubular shape in the cylindrical battery may face each other.

In particular, in the battery module 200 according to the present disclosure, the plurality of secondary batteries 100 may be configured to be laid down in a horizontal direction (a Y-axis direction). Here, the horizontal direction refers to a direction parallel to the ground. That is, as shown in FIG. 2, each of 112 secondary batteries 100 may be configured to be elongated in the front and rear direction. At this time, electrode terminals 111 may be provided at both ends of the entire secondary battery 100 in the front and rear direction (the Y-axis direction). For example, a positive electrode terminal 111*a* and a negative electrode terminal 111*b* may be positioned at front and rear sides of the secondary battery 100, respectively.

Meanwhile, terms representing directions such as front, rear, left, right, upper and lower used in this specification may vary depending on the position of an observer or the shape of an object. However, in this specification, for convenience of explanation, the directions such as front, rear, left, right, upper and lower are distinguishably expressed by setting the negative and positive directions in the Y-axis direction of FIG. 2 as front and rear directions, setting the negative and positive directions in the X-axis direction as left and right directions, and setting the positive and negative directions in the Z-axis direction as upper and lower directions.

Referring to FIG. 2, the module case 210 may include a first case 217 and a second case 219. The first case 217 may be configured such that a second case 219 is stacked at the rear thereof. For example, as shown in FIG. 2, when viewed from the Y-axis direction, the battery module 200 may include a first case 217 and a second case 219 located at the rear of the first case 217. Each of the first case 217 and the second case 219 may have a hollow H1 formed therein so that a part of the secondary battery 100 is inserted therein.

In addition, the module case 210 may include an outer wall configured to form an inner space therein to accommodate the plurality of secondary batteries 100. Thus, since the module case 210 of the present disclosure includes the outer wall, the plurality of secondary batteries 100 accommodated therein may be effectively protected from external impact.

In addition, at least two or more secondary batteries 100 may be accommodated in the inner space of the module case 210 to be laid down in the horizontal direction (the Y-axis direction). The stacking direction is not limited to one direction, and the stacking direction may be an upper and lower direction (the Z-axis direction) depending on the direction in which the secondary batteries 100 are laid down.

Therefore, according to this configuration of the present disclosure, since the module case 210 blocks the side of the secondary batteries 100 not to be exposed, the insulation of the secondary battery 100 is improved, and the secondary batteries 100 may be protected from external physical and chemical factors.

Meanwhile, referring again to FIG. 4 along with FIG. 2, the bus bar 220 may electrically connect between the plurality of secondary batteries 100, for example between all of the secondary batteries 100 or between some of the secondary batteries 100. To this end, at least a part of the bus bar 220 may be made of an electrically conductive material. For example, the bus bar 220 may be made of a metal material such as copper, aluminum, nickel, or the like. Moreover, the bus bar 220 may have a structure in which two plates using different main materials are joined. For example, the bus bar 220 may have a form in which a bus bar plate made of nickel and a bus bar plate made of copper main material are joined.

In particular, in the present disclosure, as shown in FIG. 2, the bus bar 220 may include a body portion 222 and a connection portion 224.

The body portion 222 of the bus bar 220 may have a plate shape. Moreover, the bus bar 220 may be configured in the form of a metal plate to ensure rigidity and electrical conductivity. In particular, the body portion 222 may be configured to be erected in the upper and lower direction (the Z-axis direction in the drawing) along the electrode terminals 111 of the plurality of secondary batteries 100.

That is, in the present disclosure, if the plurality of secondary batteries 100 are arranged in the left and right direction (the X-axis direction in the drawing) and/or the upper and lower direction (the Z-axis direction in the drawing) in a laid-down form elongated in the front and rear direction (the Y-axis direction in the drawing), the electrode terminals 111 of several secondary batteries 100 may be arranged in parallel in the front and rear direction (the Y-axis direction) and the upper and lower direction. In this case, the body portion 222 may be formed to extend flatly in the left and right direction and the upper and lower direction in a plate shape according to the arrangement direction of the electrode terminals 111 of the plurality of secondary batteries 100 and may be erected with respect to the ground.

Further, external terminals 223 may be provided at left and right sides of the body portion 222 of the bus bar to sense a voltage by a sensing member (not shown) or transmit power to the outside.

In addition, the bus bar 220 may contact the plurality of secondary batteries 100 of the same polarity to electrically connect them in parallel. Alternatively, the bus bar 220 may contact electrode terminals 111 of some secondary batteries 100 among all secondary batteries 100 to electrically connect them in parallel and in series.

Further, an insulation sheet 370 with electrical insulation may be provided to an outer surface of the bus bar 220. For example, as shown in FIG. 2, two insulation sheets 370 may be provided to a front surface of the bus bar 220 located at the front side and a rear surface of the bus bar 220 located at the front side, respectively.

Meanwhile, referring to FIGS. 1 and 2 again, the pack housing 310 may have a rectangular box shape as a whole. The pack housing 310 may include a front housing 312 and a rear housing 314. Specifically, a rear end of the front housing 312 may be coupled with a front end of the rear housing 314. At this time, the front housing 312 and the rear housing 314 may be coupled to each other by, for example, bolting.

Figure 3:
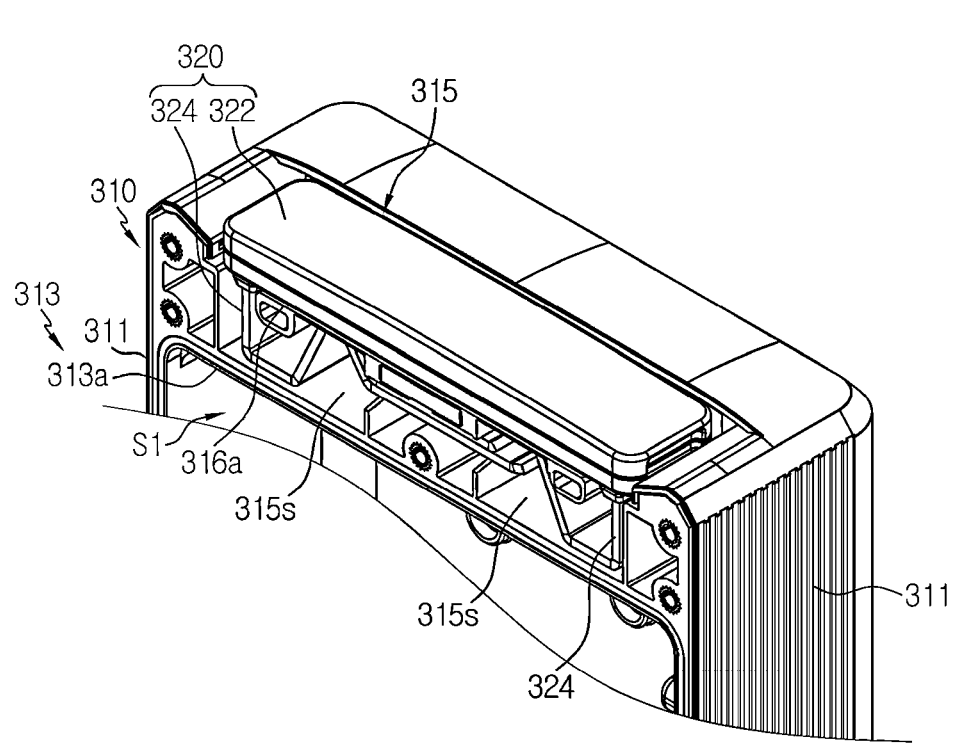
FIG. 3 is a partial perspective view schematically showing some components of the battery pack according to an embodiment of the present disclosure.

FIG. 3 is a partial perspective view schematically showing some components of the battery pack according to an embodiment of the present disclosure. In FIG. 3, the rear housing 314 and the handle 320 are depicted.

Referring to FIG. 3 along with FIG. 2, the pack housing 310 may include an outer wall 311 and an inner wall 313 configured to form an inner space for accommodating the battery module 200. For example, the pack housing 310 may include an inner upper wall 313a for covering an upper portion of the module case 210 accommodated therein and left and right outer walls 311 for covering left and right sides of the module case 210.

A handle 320 may be provided at an upper portion of the pack housing 310. The handle 320 may include a handle bar 322 and a strap 324. The handle bar 322 may have any shape that may be easily gripped by a human hand. For example, the handle bar 322 may be in the form of a bar elongated in one direction (the left and right direction). The strap 324 may be configured in the form of a bendable band. The strap 324 may be shaped to extend from each of both ends of the handle bar 322. For example, the strap 324 may have a flexible and tough material. For example, the strap 324 may be made of nylon.

In addition, the pack housing 310 may have an accommodation portion 315 for accommodating the handle 320. Specifically, the accommodation portion 315 may have a plane 316a configured so that the handle bar 322 is loaded thereon. For example, the plane 316a may be a part of a top surface of the pack housing 310, which is indented inward further to the other part of the top surface of the pack housing 310 and is flattened in a horizontal direction.

Moreover, the accommodation portion 315 may have an accommodation space 315s configured so that the strap 324 is embedded therein in a state of being bent at least once when the handle bar 322 is loaded therein. In other words, since the strap 324 has a bendable strap shape, the strap 324 connected to the lower portion of the handle bar 322 may be inserted into the accommodation space 315s in the lower direction and embedded therein, when the handle bar 322 is loaded in the accommodation portion 315 in the lower direction. In this case, the strap 324 may be bent at least once and embedded in the accommodation space 315s.

Therefore, according to this configuration of the present disclosure, since the pack housing 310 is configured such that the handle bar 322 is loaded therein and includes the accommodation portion 315 configured such that the strap 324 is embedded therein to be bent at least once when the handle bar 322 is loaded, the strap 324 of the handle 320 accommodated in the pack housing 310 may be accommodated in a bent shape, thereby minimizing the volume occupied by the strap 324, compared to the conventional case where a connection portion (a leg portion) of the handle 320 is made of hard material. Accordingly, the battery pack 300 of the same size may have a greater inner space, thereby effectively increasing the energy density of the battery pack 300.

Figure 4:
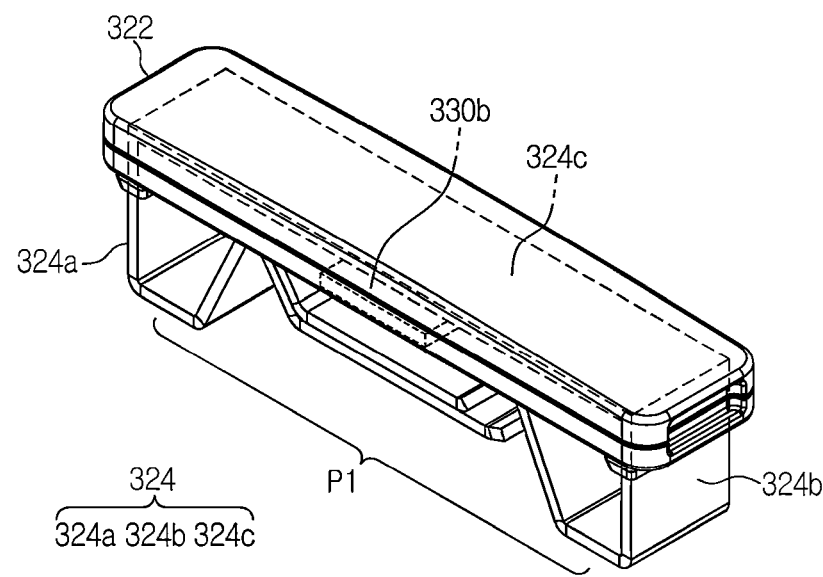
FIG. 4 is a perspective view schematically showing a handle, employed at the battery pack according to an embodiment of the present disclosure.
Figure 5:
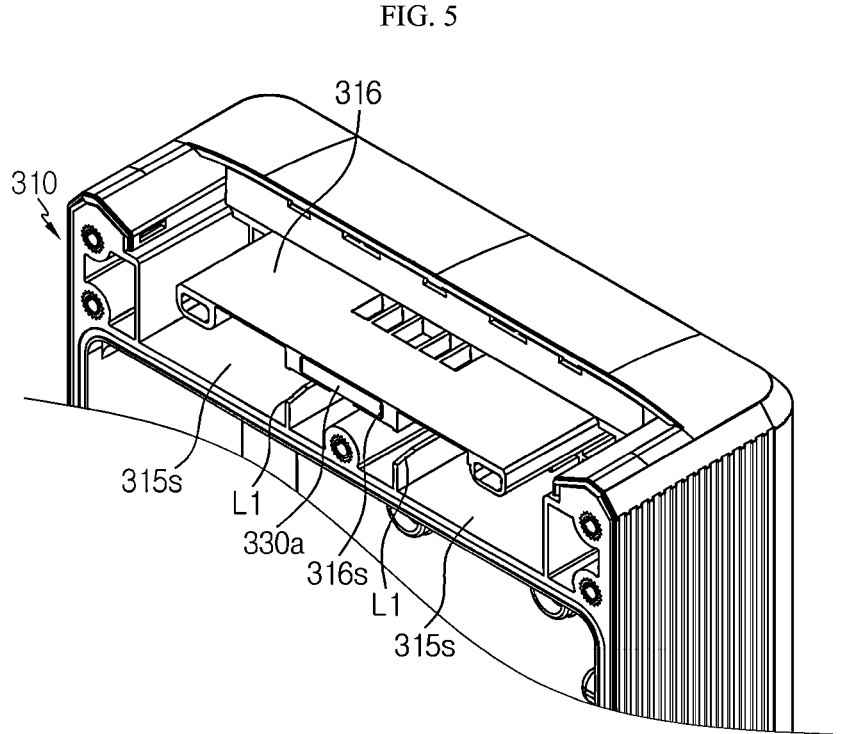
FIG. 5 is a partial perspective view schematically showing only some components of the battery pack according to an embodiment of the present disclosure.

FIG. 4 is a perspective view schematically showing a handle, employed at the battery pack according to an embodiment of the present disclosure. FIG. 5 is a partial perspective view schematically showing only some components of the battery pack according to an embodiment of the present disclosure. Also, FIG. 6 is a partial perspective view schematically showing that the handle of a battery pack according to another embodiment of the present disclosure is drawn out.

Figure 6:
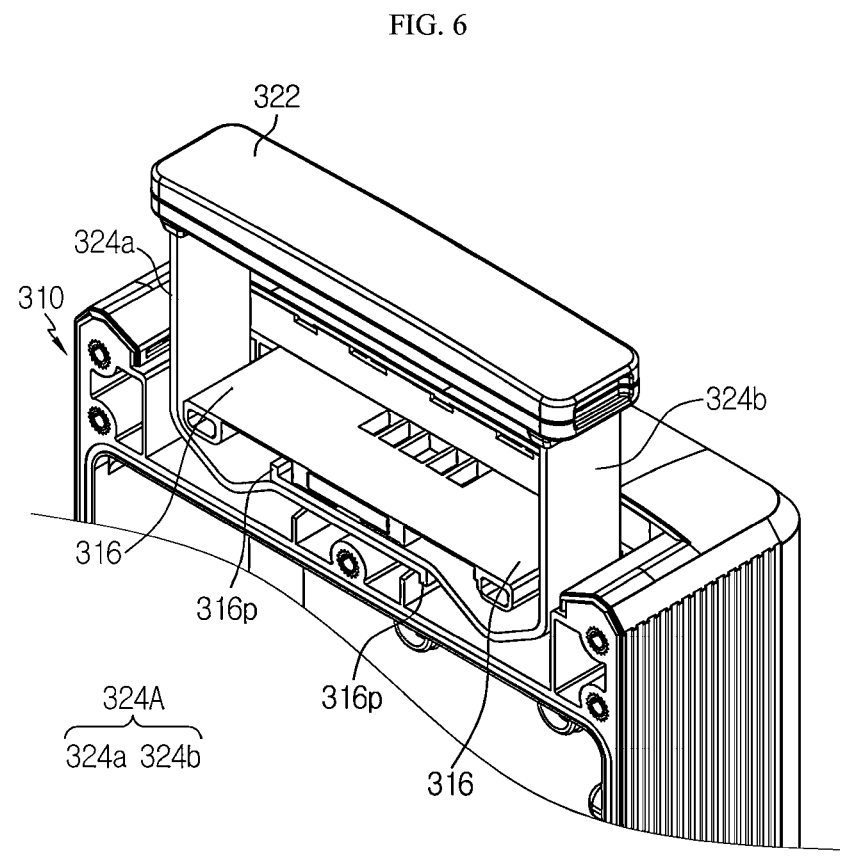

Referring to FIGS. 4 to 6, the accommodation portion 315 may be configured such that, when the handle bar 322 is drawn out, a center portion P1 between extensions of the strap 324 respectively extending from both ends of the handle bar 322 and moving upward is caught in the accommodation portion 315. Specifically, the accommodation portion 315 may include a stopper 316 for blocking the center portion P1 between the extensions of the strap 324 respectively extending from both ends of the handle bar 322 not to move upward. That is, both ends and the central portion of the stopper 316 may be configured such that the center portion P1 between the extensions of the strap 324 respectively extending from both ends of the handle bar 322 are caught. In other words, the center portion P1 of the strap 324 may be configured not to be moved upward by the stopper 316.

Therefore, according to this configuration of the present disclosure, since the accommodation portion 315 includes the stopper 316 that blocks the center portion P1 between the extensions of the strap 324 respectively extending from both ends of the handle bar 322 not to move upward, compared with the conventional handle (not shown), when the handle bar 322 is drawn out, the accommodation portion 315 may effectively restrain the handle bar 322 by the stopper 316 not to move upward. At this time, since the bendable strap 324 may maximize the area in close contact with the stopper 316, it is possible to effectively prevent the internal structure of the pack housing 310 from being damaged or broken during the use of the handle 320.

Meanwhile, referring to FIGS. 4 and 5, a receiving space 316s may be provided below the stopper 316 such that a first magnetic body 330a is embedded therein. In addition, the handle bar 322 may include a second magnetic body 330b configured to apply an attractive force to the first magnetic body 330a by a magnetic force. In this case, the first magnetic body 330a and the second magnetic body 330b may be provided at positions corresponding to each other.

That is, when the handle bar 322 is mounted on the stopper 316, the first magnetic body 330a embedded in the receiving space 316s and the second magnetic body 330b provided to the handle bar 322 may be located close to each other such that the handle bar 322 is fixed onto the stopper 316. That is, as shown in the FIG. 5, the receiving space 316s for accommodating the first magnetic body 330a may be located at the center of the stopper 316. In addition, as shown in FIG. 4, the second magnetic body 330b may be located at the inner center of the handle bar 322.

Therefore, according to this configuration of the present disclosure, since the receiving space 316s including the first magnetic body 330a therein is provided below the stopper 316 and the handle bar 322 includes the second magnetic body 330b configured to apply an attractive force to the first magnetic body 330a by a magnetic force, the handle bar 322 may be easily mounted in the accommodation portion 315. That is, the handle bar 322 may be automatically fixed in position in the accommodation portion 315 by means of the magnetic force of the first magnetic body 330a and the second magnetic body 330b. Accordingly, the convenience of use of the battery pack 300 of the present disclosure may be greatly improved.

Referring to FIGS. 4 and 5 again, the strap 324 may have a loop form connected integrally. Both ends of the strap 324 may be coupled to each other in a state of overlapping with each other. At this time, both ends of the strap 324 may be coupled to each other by bolting.

For example, as shown in FIGS. 4 and 6, the strap 324 may include a first extension 324a extending from one longitudinal end of the handle bar 322 and a second extension 324b extending from the other longitudinal end of the handle bar 322 and having one end coupled to one end of the first extension 324a to overlap with the end. Also, remaining portion (or, an upper portion) 324c of the strap 324 may be positioned inside the handle bar 322. The upper portion 324c of the strap 324 may be positioned inside the handle bar 322. In addition, at least a part of the upper portion 324c of the strap 324 may be fixed inside the handle bar 322.

Therefore, according to this configuration of the present disclosure, since the strap 324 has an integrally connected loop form and a part of the strap 324 is positioned inside the handle bar 322, the strap 324 may be provided in an integral form. The integrated strap 324 may be much more durable, compared to a strap in a separated form.

Referring to FIGS. 4 and 5 again, the accommodation portion 315 may have a slit L1 in which the ends of the first extension 324a and the second extension 324b of the strap 324 coupled to each other to overlap with each other is inserted and fixed. The slit L1 may be located below the center of the stopper 316. The slit L1 may be a space separated apart between a rib-shaped partition wall formed in the accommodation space 315s and the stopper 316. In addition, the space formed by the slit L1 may have a height corresponding to or somewhat smaller than the vertical thickness of the overlapped portions of the first extension 324a and the second extension 324b.

Therefore, according to this configuration of the present disclosure, since the accommodation portion 315 has the slit L1 in which the overlapped and coupled portions of the first extension 324a and the second extension 324b are inserted and fixed, the strap 324 may be easily fixed to the accommodation portion 315. Therefore, it is possible to increase the manufacturing efficiency of the battery pack 300.

In addition, referring to FIGS. 4 to 6, a strap 324A according to another embodiment may further include a fixing protrusion 316p provided to each of the first extension 324a and the second extension 324b. The fixing protrusion 316p may be configured to prevent the first extension 324a and the second extension 324b of the strap 324 from moving in the left and right direction. The fixing protrusion 316p may be configured to be caught by the outer surface of the slit L1 not to move. For example, as shown in FIG. 6, the fixing protrusion 316p may be provided at each of a distal end of the first extension 324a and a distal end of the second extension 324b.

Therefore, according to this configuration of the present disclosure, since the strap 324 includes the fixing protrusion 316p provided to each of the first extension 324a and the second extension 324b, the lower portion of the strap 324 may be more completely fixed to the accommodation portion 315. Accordingly, it is possible to prevent a part of the strap 324 from being moved or separated from the slit L1, thereby increasing the convenience of use of the battery pack 300 and reducing a failure of the handle.

Figure 7:
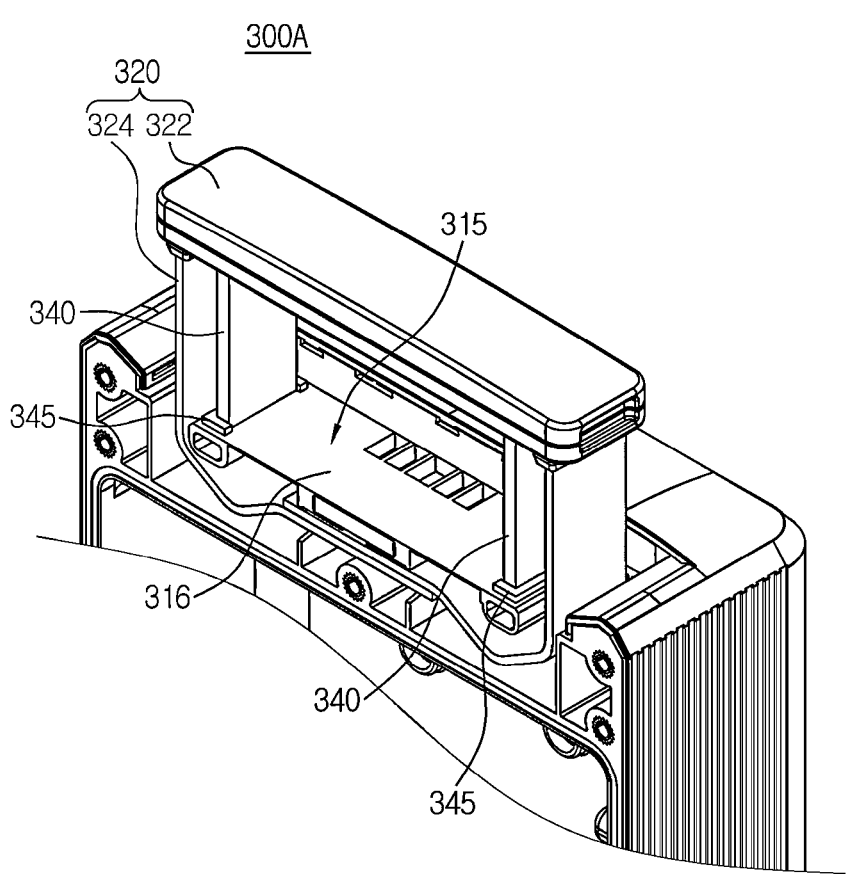
FIG. 7 is a partial perspective view schematically showing some components of the battery pack according to another embodiment of the present disclosure.
Figure 8:
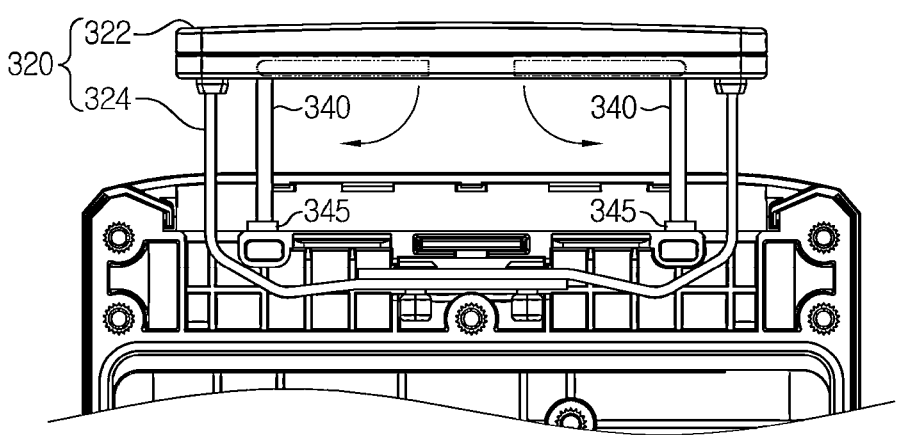
FIG. 8 is a partial front view schematically showing some components of the battery pack of FIG. 7.

FIG. 7 is a partial perspective view schematically showing some components of the battery pack according to another embodiment of the present disclosure. Also, FIG. 8 is a partial front view schematically showing some components of the battery pack of FIG. 7. FIG. 8 shows a state where an auxiliary support 340 is pivoted, for convenience of explanation.

Referring to FIGS. 7 and 8, a battery pack 300A of FIG. 7 may further include an auxiliary support 340, compared to the battery pack 300 of FIG. 3. That is, the battery pack 300A of FIG. 7 has the same configurations as the battery pack 300 of FIG. 3 except for the auxiliary support 340.

Specifically, the auxiliary support 340 may be configured such that, when the handle bar 322 is drawn out of the accommodation portion 315 by a user, the other end of the auxiliary support 340 is moved away from the handle bar 322 by pivotal movement based on a hinged portion. The auxiliary support 340 may have a structure hinged to the handle bar 322.

For example, as shown in FIG. 8, two auxiliary supports 340 may be provided to the handle 320. The two auxiliary supports 340 may be embedded in the handle bar 322 when the handle bar 322 is accommodated in the accommodation portion 315. Conversely, if the handle bar 322 is drawn out from the accommodation portion 315, the two auxiliary supports 340 may be configured to be pivoted outward in left and right directions with respect to a center between the two auxiliary supports 340.

In addition, the auxiliary support 340 may be configured such that the other end pivotally moved is supported upward on the stopper 316 by the upper surface of the stopper 316. Accordingly, the auxiliary support 340 may serve to support the handle bar 322 upward. Moreover, if two auxiliary supports 340 are provided, it is possible to prevent the handle bar 322 from moving in the left and right direction. That is, for example, as shown in FIG. 8, the auxiliary support 340 located at the left side may prevent the handle bar 322 from moving to the right, and the auxiliary support 340 located at the right side may prevent the handle bar 322 from moving to the left.

Therefore, according to this configuration of the present disclosure, since the auxiliary support 340 is further provided to be hinged to the handle bar 322 such that, if the handle bar 322 is drawn out of the accommodation portion 315 by the user, the other end of the auxiliary support 340 is moved away from the handle bar 322 by pivotal movement based on the hinged portion and the other end of the auxiliary support 340 moved by pivotal movement based on the hinged portion is supported on the stopper 316, when the strap 324 is configured to be bendable or is made of a flexible material, it is possible to prevent the handle bar 322 from seriously moving while the battery pack is carried. Accordingly, it is possible to effectively reduce shaking of the battery pack 300A that may be caused while the user is holding the handle 320 and carrying the battery pack 300A.

In addition, the stopper 316 may include a holding protrusion 345 to restrain the pivotal movement of the other end of the auxiliary support 340 based on the hinged portion. The holding protrusion 345 may be shaped corresponding to the other end of the auxiliary support 340. For example, the holding protrusion 345 may be configured to surround a part of the other end of the auxiliary support 340. For example, as shown in FIG. 7, the holding protrusion 345 may have a plate shape in the form of 'a'. That is, the holding protrusion 345 may include a portion extending in the front and rear direction and portions extending in the left and right direction from both front and rear ends of the portion extending in the front and rear direction.

An insert groove (not shown) formed by recessing a portion of the handle bar 322 may be provided at a lower portion of the handle bar 322 so that at least a part of the holding protrusion 345 is inserted therein. The insert groove may be configured such that when the handle bar 322 is loaded on the stopper 316, at least a part of the holding protrusion 345 is inserted therein. The handle bar 322 may be loaded in place on the stopper 316 by the insert groove.

Therefore, according to this configuration of the present disclosure, since the stopper 316 includes the holding protrusion 345 protruding upward with a shape corresponding to the other end of the auxiliary support 340 to restrain the pivotal movement of the other end of the auxiliary support 340 based on the hinged portion, the other end of the auxiliary support 340 may be stably fixed on the stopper 316. Moreover, if the holding protrusion 345 is inserted into the insert groove provided to the handle bar 322, it is possible to guide the handle bar 322 to be loaded in place on the stopper 316. Therefore, the convenience of use of the battery pack 300A of the present disclosure may be greatly improved.

Figure 9:
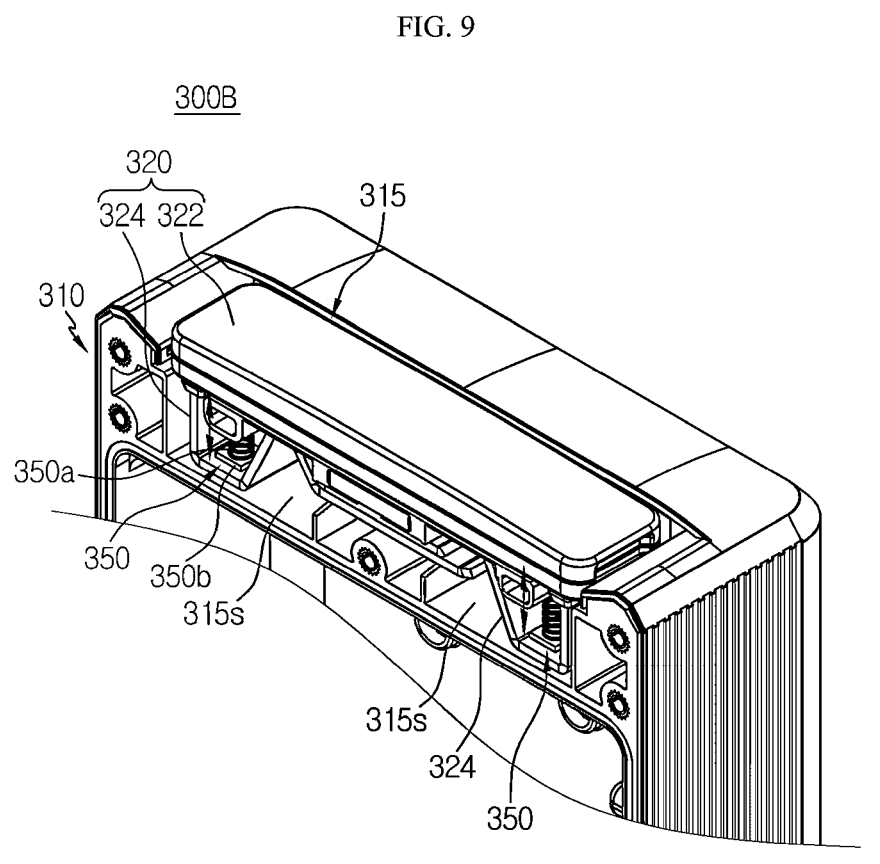

FIG. 9 is a partial perspective view schematically showing some components of a battery pack according to still another embodiment of the present disclosure.

Referring to FIG. 9, when compared with the battery pack 300 of FIG. 6, a battery pack 300B of FIG. 9 may further include an elastic member 350 in the accommodation portion 315. The elastic member 350 may be configured to elastically press a part of the strap 324 upward or downward. When the strap 324 is embedded in the accommodation space 315s, the elastic member 350 may press a part of the strap 324 so that the strap 324 is bent automatically. For example, as shown in FIG. 9, two elastic members 350 may be provided in the accommodation portion 315. Each of the two elastic members 350 may be configured to press a part of the strap 324 downward.

Therefore, according to this configuration of the present disclosure, since the accommodation portion 315 includes the elastic member 350 configured to elastically press a part of the strap 324 upward or downward, when the handle 320 is accommodated in the accommodation portion 315 of the pack housing 310, the strap 324 may be embedded in the accommodation space 315s in a state of being automatically bent at least once. Accordingly, it is possible to reduce the inconvenience caused when the strap 324 is not easily bent and thus not easily embedded in the accommodation space 315s.

Moreover, the elastic member 350 may include a spring 350a that is contracted by a predetermined distance by the strap 324 when the handle 320 is drawn out of the accommodation portion 315. In addition, the elastic member 350 may have a pressing plate 350b to prevent the center portion P1 (FIG. 4) between the extensions of the strap 324 extending respectively from both ends of the handle bar 322 from moving upward, in a contracted state.

For example, as shown in FIG. 9, the accommodation portion 315 may include two elastic members 350 respectively provided to both left and right sides of the accommodation space 315s. When the handle bar 322 is drawn out of the stopper 316, the spring 350a of each of the two elastic members 350 may be pressed and compressed upward by the strap 324. The two elastic members 350 compressed by pressure may prevent the center portion of the strap 324 from moving upward by the pressing plate 350b.

Therefore, according to this configuration of the present disclosure, since the elastic member 350 is configured to be contracted by a predetermined distance to block the movement of the center portion between the extensions of the strap 324 respectively extending from both ends of the handle bar 322 when the handle 320 is drawn out of the accommodation portion 315, in the present disclosure, the strap 324 may be in close contact with the elastic member 350 together with the stopper 316, so the strap 324 may stably restrict the upward movement of the accommodation portion 315.

In addition, since the strap 324 is in close contact with the elastic member 350 to increase the contact area in close contact with the accommodation portion 315, the weight force of the battery pack 300B caused by drawing out the handle 320 is not concentrated on any part of the accommodation portion 315, thereby reducing the damage of the accommodation portion 315 that may occur during the use of the handle 320.

Meanwhile, the battery pack 300 according to an embodiment of the present disclosure may include at least one battery module 200. In addition, the battery pack 300 may further include various devices (not shown) for controlling charging and discharging of the battery module 200, for example a battery management system (BMS), a current sensor, a fuse, and the like.

Meanwhile, an electronic device (not shown) according to an embodiment of the present disclosure includes at least one battery pack 300 described above. The electronic device may further include a device housing (not shown) having an accommodation space for accommodating the battery module 200, and a display unit through which a user may check the state of charge (SOC) of the battery module 200.

In addition, the battery pack 300 according to an embodiment of the present disclosure may be included in a vehicle such as an electric vehicle or a hybrid electric vehicle. That is, at least one battery pack 300 according to an embodiment of the present disclosure described above may be loaded in a vehicle body of the vehicle according to an embodiment of the present disclosure.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 300: battery pack | |
| 100: secondary battery | 200: battery module |
| 210: module case | |
| 111, 111a, 111b: electrode terminal, positive electrode terminal, negative electrode terminal | |
| 310: pack housing | 311: outer wall |
| 320: handle | 322: handle bar |
| 324: strap | 315: accommodation portion |
| 316: stopper | 315s: accommodation space |
| 316s: receiving space | 330a, 330b: first magnetic body, second magnetic body |

-continued

| Reference Signs | |
| --- | --- |
| 324a, 324b: first extension, second extension | L1: slit |
| 340: auxiliary support | 345: holding protrusion |
| 350: elastic member | |

INDUSTRIAL APPLICABILITY

The present disclosure relates to a battery pack. In addition, the present disclosure may be used in an electronic device to which the battery pack is applied and a vehicle industry including the battery pack.

What is claimed is:

1. A battery pack, comprising:
a battery module having a plurality of secondary batteries; and
a pack housing including an outer wall to form an inner space for accommodating the battery module, a handle having a handle bar elongated in a horizontal direction and a strap in the form of a bendable strap to respectively extend from both ends of the handle bar, and an accommodation portion such that the handle bar is loaded therein,
wherein the strap is fully accommodated in the accommodation portion in a state of being bent at least once when the handle bar is stored in the accommodation portion, and wherein a center portion of the strap between extensions of the strap respectively extending from both ends of the handle bar is retained in the accommodation portion when the handle bar is extended in a vertical direction out of the accommodation portion;
wherein the accommodation portion includes:
a stopper configured to block the center portion to retain the handle, the handle bar being over the stopper with the center portion of the strap being under the stopper such that the strap forms loop around the stopper; and
an accommodation space in which the strap is accommodated,
wherein the handle bar is configured to be on the stopper when the handle bar is stored in the accommodation portion,
wherein the stopper includes a first magnetic body on a lower portion of the stopper at a central portion of the stopper with respect to the horizontal direction,
wherein the handle bar includes a second magnetic body configured to apply an attractive force to the first magnetic body by a magnetic force, the second magnetic body being at a central portion of the handle bar with respect to the horizontal direction and aligned with the first magnetic body in the vertical direction,
wherein the strap defines an integral loop form, and a portion of the strap is inside the handle bar, and
wherein the handle further includes an auxiliary support embedded in the handle bar and hinged to the handle bar such that the other end thereof is moved away from the handle bar by pivotal movement based on the hinged portion when the handle bar is drawn out of the accommodation portion by a user, and the other end of the auxiliary support moved by pivotal movement based on the hinged portion is supported on the stopper.

2. The battery pack according to claim 1, wherein the strap includes:
a first extension extending from one longitudinal end of the handle bar; and
a second extension extending from the other longitudinal end of the handle bar and having an end coupled to an end of the first extension to overlap with the end, and
wherein the accommodation portion has a slit in which the portions of the first extension and the second extension coupled to each other to overlap is inserted and fixed.

3. The battery pack according to claim 1,
wherein the stopper includes a holding protrusion shaped corresponding to the other end of the auxiliary support and protruding upward to restrain the pivotal movement of the other end of the auxiliary support based on the hinged portion.

4. The battery pack according to claim 1,
wherein the accommodation portion includes an elastic member configured to elastically press a part of the strap upward or downward.

5. The battery pack according to claim 4,
wherein when the handle is drawn out of the accommodation portion, the elastic member is contracted by a predetermined distance to block the center portion between the extensions of the strap respectively extending from both ends of the handle bar not to move.

6. An electronic device, comprising at least one battery pack according to claim 1.

7. A vehicle, comprising at least one battery pack according to claim 1.

8. The battery pack according to claim 1, wherein the stopper is elongated in the horizontal direction.

9. The battery pack according to claim 1, when the handle bar is extended out of the accommodation portion, the extensions of the strap extend in the vertical direction.

* * * * *